Figure 1:
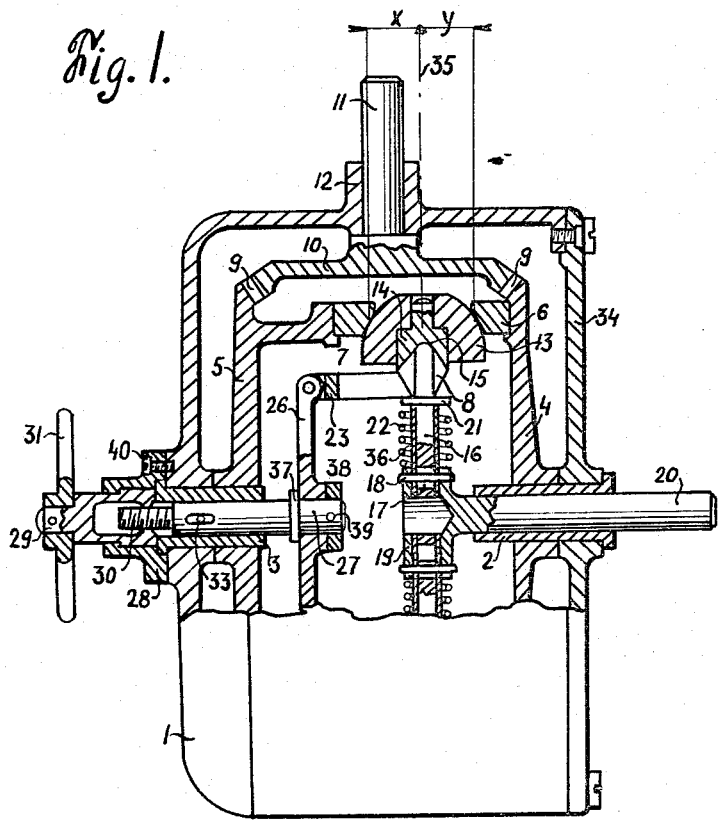

INVENTOR.
Miroslav Kotík
BY

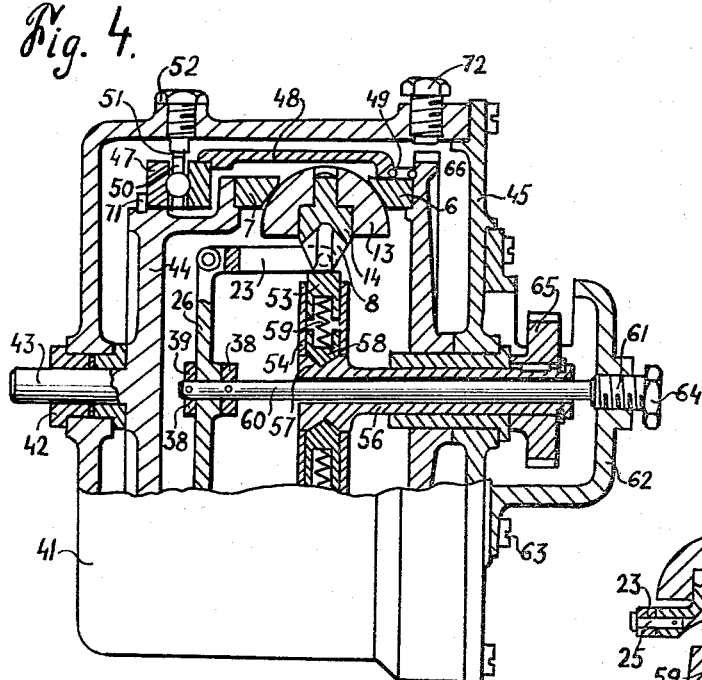
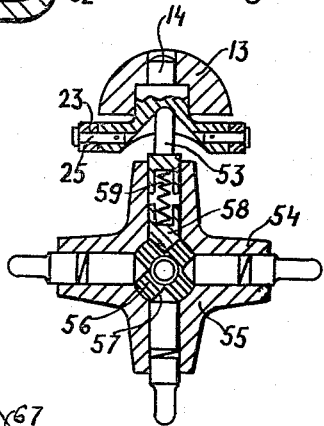
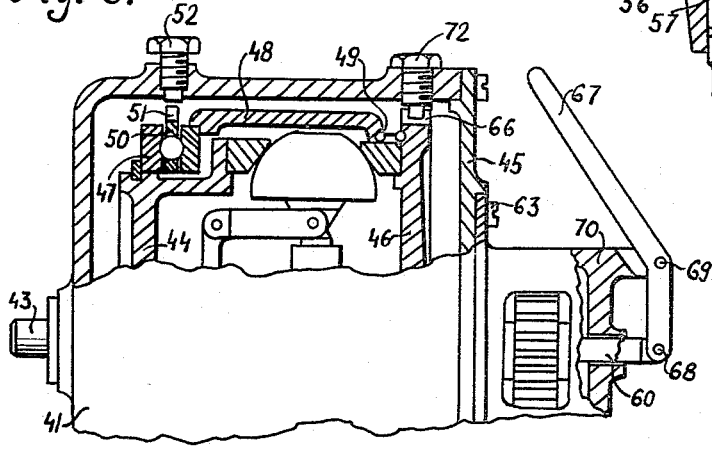

3,287,994
VARIABLE SPEED DRIVE
Miroslav Kotík, Brno, Czechoslovakia, assignor to Elitex, Sdruzeni podniku textilniho strojirenstvi, Liberec, Czechoslovakia
Filed Sept. 17, 1964, Ser. No. 397,169
Claims priority, application Czechoslovakia, Sept. 26, 1963, 5,269/63
7 Claims. (Cl. 74—721)

The present invention is concerned with a device for changing continuously the number of revolutions of an output shaft, said device enabling at the same time the change of the sense of rotation of said output shaft.

The devices for changing continuously the number of revolutions, being hitherto known, consist of two discs one of said discs being firmly connected with the input shaft and the other with the output shaft, whereby a system of balls, situated rotatably on said shafts and being supported against a guide ring, bears against the discs. The continuous change of revolutions is carried out by inclining the ball shafts, e.g. by means of gates, said gates being provided with spiral-shaped grooves, the ends of said ball shafts being mounted shiftably in said grooves. The drawback of these devices is that they are considerably complicated from the production viewpoint.

Another drawback rests in the fact, that with such a device the change of the number of revolutions of the output shaft can be brought about only in one sense of rotation. The control device of these devices is from the viewpoint of production as well as from the viewpoint of design rather complicated, requiring big forces for changing the number of revolutions of the output shaft.

Further devices are known, consisting of a friction drum firmly connected to the input shaft, said friction drum driving on its circumference a system of balls, rotatably mounted on shafts, said balls engaging one stationary disc and one rotatable disc, the latter being firmly connected to the output shaft. The continuous change of revolutions as well as the sense of rotation is achieved by inclining the ball shafts. The control device of these devices is still more complicated than in the device described before and consists of a whole lever system, said lever system requiring by its passive resistances a considerable control force and, simultaneously a great number of parts forming said control device causes incorrect adjustment of the individual balls, whereby the efficiency as well as the durability of the whole device is detrimentally affected.

Still further devices are known for the same purpose, said devices consisting of two shaped friction discs, between which a system of rotatably mounted rollers is swingingly mounted. The rotatable roller system bears against the outer side of one of said friction discs, said roller system bearing on the other side against a friction ring, said ring being firmly connected with the input shaft. The rotatable roller system is connected to the output shaft by means of a rose. The speed control as well as the control of the sense of rotation is carried out by tilting the axes of the rotatable rollers by means of a motion screw, a nut and a lever mechanism. The main disadvantage of said device rests in its complicated design, which is caused primarily by the application of two roller systems. The number of rollers, transmitting directly the power, is considerably limited by the fact that the rollers approach during their swinging movement in the course of the control process with their contact part always towards the axis of one of said discs and roll thereby on a smaller radius, whereby the transmitted torque varies in dependence of the speed control, which is undesirable. The control mechanism needs a considerable input and is very complicated as to its production.

Still another device is known, based on the principle of two coaxially mounted concave discs, said discs being driven by an interposed cone-shaped wheel, said wheel being interposed in the opposite direction. Between said concave discs a system of friction rollers is situated, said system being swingingly mounted on an output shaft.

A great disadvantage of the above device is the complicated production of concave discs and a considerably limited number of friction rollers, approaching during the swinging movement, as in the previous case, the axes of one of said discs, whereby again an undesirable change of the transmitted moment is caused.

Said drawbacks are overcome by the present invention, residing in the fact that the system of rolling elements consists of a branched hub situated on the output shaft, said hub being provided with means for evoking a resilient pressure force on the rolling elements, said elements being connected with the control mechanism and being further characterised in that in the models with the output shaft control in the range of the positive and negative revolutions as well as in the range of only positive revolutions and axial antifriction bearing is interposed between the discs, the cage of the axial antifriction bearing and the disc being adapted for stopping their movement.

The advantage of the variable speed drive according to the present invention resides in the fact that the rolling elements engage the discs only along two rolling paths of simple shape, this affecting positively the production as well as the efficiency of the device. Another advantage of the variable speed drive is that less force is required for varying the speed of the output shaft or the sense of rotation, which is caused on one hand by the small number of transmission levers with considerably lower passive resistance forces than in the variable speed drives hitherto known and by a simplified mounting of the rolling elements.

Another considerable advantage of the present invention is that the transmitted moment is independent of the control position and constant. A still further advantage is the overall simplicity of design and production of the variable speed drive according to the present invention in comparison with the known and described devices, residing also in the fact that the axial distance of the friction discs requires a considerably lower accuracy of production and adjustment than the devices known hitherto, as the rolling elements are pressed against the friction discs in the direction of radial forces.

The advantage of the variable speed drive model in FIG. 4 is that by mere rearrangement of e.g. two screws it is possible to charge the variable speed drive having negative, zero and positive revolutions on its output shaft in view of the sense of rotation of the input shaft into a variable speed drive with only positive revolutions of the output shaft. This adaptation would be very complicated with the variable speed drives hitherto known and in several cases impossible at all.

Figure 2:
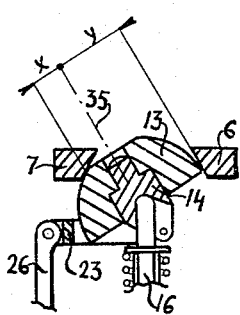
Figure 3:
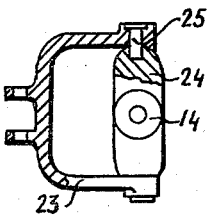

A device according to the present invention in form of example is shown in the accompanying drawings, of which FIG. 1 represents a longitudinal axial section through the device, FIG. 2 one rolling element in the swung-out position, FIG. 3 a partial section through the swinging out shaft with a yoke, FIG. 4 represents a model of the present invention enabling to change the characteristics of the variable speed drive together with a mechanism for the control of the pressure force between the rolling elements and the rolling rings, FIG. 5 represents a partial cross section through the output shaft with the rolling element and FIG. 6 a partial longitudinal section through the variable speed drive as shown in FIG. 4 after having changed its characteristics. At the same time, FIG. 6 represents an alternative model of the control mechanism of the variable speed drive.

In the housing 1 of the variable speed drive—see FIG. 1—the journal box 3 is situated coaxial to, but opposite journal box 2 in the cover 34. On journal box 2 a disc 4 is rotatably mounted, said disc being provided on its circumference with conical gearing 9 and on its front wall, pointing towards the centre of housing 1 with a rolling ring 6. On journal box 3, disc 5 is rotatably mounted, said disc being also equipped with conical gearing 9 and on its front wall, pointing towards disc 4, with a rolling ring 7. The two discs 4 and 5 are engaged with the conical gearing 9 of an interposed gear 10, said gear being firmly connected with input shaft 11, said shaft being rotatably mounted in the bearing 12 of the housing 1 of the variable speed drive in such a way that during the rotary movement of input shaft 11 in one sense, discs 4 and 5 are rotating in mutually opposite senses. The rolling rings 6 and 7 are engaged with the system of rolling elements 13, said elements showing advantageously the shape of hemispheres. The rolling elements 13 are rotatably mounted on swinging shafts 14, equipped with an opening 8, on the end of said opening a ball shaped seat 15 is situated in such a way, that the centre of the ball shaped seat 15 is advantageously coinciding with the center of the rolling element 13. The ball shaped seats 15 are engaged by the ball shaped ends of pins 16, the opposite ends of which are shiftably mounted in the guiding tubes 36, which, in turn are stationarily arranged in the branched hub 19 of the output shaft 20. The pins 16 are provided with longitudinal openings 17 extending across said pins, pegs 18 being situated in said openings for the adjustment of the shiftable connection of pins 16 with the branched hub 19. Approximately in its central part, every pin 16 is equipped with a ring 21, against which bears with one of its ends the pressure spring 22, whereas the other ends of each pressure spring 22 bears against the branched hub 19. The openings 8 in the swingable shafts 14 are conically expanded in the direction from the ball shaped seats 15 towards the surface, whereby the swinging movement of the swingable shafts 14 is achieved together with the rolling elements 13 on pins 16. The swingable shafts 14 are equipped with extension sleeves 24—see FIG. 3—in which bearing pegs 25 are anchored, fork-shaped yokes 23 being swingably mounted on them. Yokes 23 are articulated with spider 26, said spider being rotatably mounted on tie rod 27, said tie rod being axially movable in the journal box 3. The spider 26 is prevented from axial movement on tie rod 27 from one side e.g. by ring 37 and from the opposite side e.g. by a securing ring 38 and a pin 39. A flange 28 is fixed to the housing 1 of the variable speed drive e.g. by screws 40, control nut 29 being rotatably mounted in said flange 28, said control nut being engaged with the threads 30, made on one end of the tie rod 27. In order to prevent tie rod 27 from rotary movement and to adjust simultaneously its axial movement, tie rod 27 is equipped e.g. with a longitudinal opening 32 extending across said tie rod, and adjusting pin 33 extending through said opening and being firmly mounted in journal box 3. The control nut 29 is equipped for better handling with a hand wheel 31. The variable speed drive model in FIG. 4 is essentially congruent with the device in FIG. 1, however, it differs in the arrangement of its input shaft, its disc drive, means for exerting an elastic pressure force on the rolling elements and last but not least in the control elements of the control mechanism.

In the housing 41 of the variable speed drive e.g. a journal box 42, consisting of two parts, the input shaft 43 is rotatably mounted, said shaft being firmly connected with disc 44. Oppositely of said journal box 42, journal box 2 is situated coaxially in the cover 45, disc 46 being mounted rotatably on journal box 2. The two discs 44 and 46 are provided on their mutually adjacent sides with rolling rings 6 and 7. On the circumference of disc 44, one ring of the axial antifriction bearing 47 is pressed and secured by the securing ring 71, whereas the other ring of the axial antifriction bearing 47 is connected by means of ring 48 with disc 46, the necessary friction in the axial antifriction bearing 47 being exerted by spring 49, which is spiral-shaped and situated between disc 46 and ring 48. The cage 50 of the axial antifriction bearing 47 is provided on its outer circumference with securing surfaces 51, securing elements, e.g. screws 52 being arranged oppositely to said surfaces. These screws are screwed into the housing 1 of the variable speed drive. The rolling rings 6 and 7 are engaged with the system of rolling elements 13, which have advantageously a hemisphere shape. The rolling elements 13 are pivotally mounted on the swingable shafts 14, said shafts being provided with an opening 8, having a ball shaped seat 15 on its end, the centre of said seat 15 being advantageously identical with the centre of the rolling element 13. The ball shaped seats 15—see FIG. 5—are engaged by ball shaped ends entraining pins 53, whereas the opposite ends of said pins are mounted in the guiding sleeves 54 of the branched hub 55, said hub being rotatably mounted on the hollow output shaft 56, said shaft being provided with cone shaped seats 57, which are engaged with the cone-shaped foot parts of the supporting fillers 58. The supporting fillers 58 bear against the entraining pins 53. The openings 8 in the swingable shafts 14 are conically expanded from the cone shaped seats 15 towards the surface, whereby the swinging movement of the swingable shafts 14 with the rolling elements 13 on their entraining pins 53 is made possible. The swingable shafts 14 are provided with extension pieces 24, the bearing pins 25 being anchored in them, whereas on said bearing pins the fork shaped yokes 23 are swingably mounted. The yokes 23 are articulated on a spider 26, said spider being rotatably mounted on the control tie rod 60, said tie rod being axially movable in the hollow output shaft 56. Spider 26 is secured against axial movement on the control tie rod 60 from both sides by securing rings 38 and pins 39. The opposite end of the control tie rod 60 has threads 61, by means of which the control tie rod 60 is mounted in the headpiece 62, said headpiece being connected e.g. by screws 63 to the cover 45 of housing 41 of the variable speed drive. On the same end of the tie rod 60 a hexagon 64 is arranged for easier adjustment of tie rod. The hollow output shaft 56 is provided outside of the housing 41 of the variable speed drive e.g. by a transmission gear 65. Disc 46 has on its circumference securing surfaces 66, securing elements e.g. screws 72 being arranged oppositely in the housing 41. In FIG. 6 the speed control and the control of the sense of rotation of hollow output shaft 56 are represented. The threads 61 and the hexagon 64 of FIG. 4 are replaced by a double arm lever 67, swingably connected with its one end by means of e.g. pin 68 with tie rod 60 and with its pivot point by means of pin 69 to the bracket 70 said bracket being connected e.g. by screws 63 to the cover 45 of housing 1 of the variable speed drive.

The variable speed drive according to the present invention works as follows:

The rotary movement e.g. from an electric motor (not shown) is transmitted over the input shaft 11—see FIG. 1—to the interposed gear 10, said gear transmitting a rotary movement to the discs 4 and 5, said movement, however, being exerted by the said discs in mutually opposite senses. The rolling rings 6 and 7 of the two discs 4 and 5 cause the rotary movement of the rolling elements 13 on the swingable shafts 14. The pressure force between the rolling elements 13 and the rolling rings 6 and 7 is exerted by the pressure springs 22 by means of pins 16, said pins bearing against the ball shaped seats 15 in the swingable shafts 14 by their ball shaped ends. In the position of the swingable shafts 14 according to FIG. 1, i.e. when the axes 35 of the swingable shafts 14 are identical with the axes of pins 16, the rolling radius $x$ is of the same magnitude as the rolling radius $y$ and the rolling elements 13 are rotating only around axis 35, the output shaft 20 does not perform any rotary movement. When swinging out the swingable shafts 14—see FIG. 2—in the manner as described below, the two values of the rolling radii $x$ and $y$ become unequal, and therefore on the base of unequal rolling paths on the rolling elements 13 a rotary movement of the whole system of rolling elements 13 with the output shaft 20 is brought about in addition to the rotary movement of the rolling elements 13 on the swingable shafts 14, the sense of rotation of said additional movement being in accordance with either disc 4 or disc 5, in dependence of that which one is in contact with the smaller rolling radius $x$ or $y$ of the rolling elements 13. The speed control and the control of the sense of rotation of output shaft 20, i.e. the swinging movement of swingable shafts 14 is done by the rotary movement of handwheel 31, which is firmly connected with the control nut 29, whereby axial movement of the tie rod 27 and thereby the adjustment of spider 26, mounted rotatably on said tie rod 27 and articulated with the ends of its arm with yokes 23 is brought about by means of threads 30. This movement of yokes 23 causes the swinging movement of the swingable shafts 14 on pins 16, said shafts being swingingly connected with yokes 23, and thereby also the swinging movement of rolling elements 13, being swingingly mounted on the swingable shafts 14 as described above, is brought about. By turning the handwheel 31 in one direction, the rolling elements 13 are swung out between the rolling rings 6 and 7 on one side, whereby the output shaft is rotated in one sense, whereas by rotating the handwheel 31 in the opposite sense the rolling elements 13 are swung out in the opposite direction, whereby the rotary movement of the output shaft 20 has the opposite sense. The actual transmission ratio depends on the extent of swinging out the swingable shafts 14 in the positive as well as in the negative senses. The variable speed drive model as represented in FIG. 4 works similarly as the model in FIG. 1, the rotary movement, however, being transmitted over the input shaft 43 directly to disc 44, whereby the rotary movement of disc 46 in the opposite direction is achieved by connecting the cage 50 of the axial antifriction bearing 47 e.g. by means of a screw 52 with the housing 41 of the variable speed drive, said connection causing during the rotary movement of one ring of the axial antifrictional bearing 47 together with disc 44 the rotary movement of the second ring of the axial antifriction bearing 47 in the opposite sense. When conecting this ring of the axial antifriction bearing 47 by means of ring 48 and spring 49 with disc 46, both discs 44 and 46 are rotated in opposite senses. The pressure force between the rolling rings 6 and 7 and the rolling elements 13 is exerted in dependence of the load of the hollow output shaft 56 in such a way, that in the case of an increased resistance on the hollow output shaft 56 its relative backward turning in respect of the branched hub 55 is brought about, whereby the bearing inserts 58 are pressed out of the cone-shaped seats 57 of hollow output shaft 56 by influence of their cone-shaped foot part. The bearing insert 58 press together the pressing springs 59 by their centrifugal movement in the guiding extensions 54 of the branched hub 55, whereby the pressing force between the rolling elements 13 and the rolling rings 6 and 7 is increased. The variable speed drive is thus able to transmit an increased torque. These means for exerting an elastic pressure force work simultaneously as a securing mechanism of the variable speed drive in the case of a high overload of the hollow output shaft 56, when the bearing inserts 58 are pressed out completely from the cone-shaped seats 57 and by influence of the rotary movement of the branched hub 55 on the hollow output shaft 56 and are wandering over the cone-shaped seats 57. Continuous speed variation and variation of the sense of rotation of the hollow output shaft 56 is achieved by turning the hexagon 64, e.g. by a wrench or a crank (not shown) whereby, by influence of threads 61 in the headpiece 62 on the tie rod 60, said threads cooperating with the counterthreads in the headpiece 62, whereby axial adjustment of the tie rod 60 and thereby swinging movement of the rolling elements 13, as described before, is brought about. Speed variation in the model in FIG. 6 is achieved e.g. by swinging out the double-arm lever 67 manually, whereby again the axial adjustment of the tie rod 60 is achieved.

The model of the variable speed drive in FIG. 4 after modification according to FIG. 6, i.e. after bringing screw 52 out of engagement with the securing surface 51 in the cage 50 and screwing screw 72 into the housing 41 of the variable speed drive in such a way, that the end of screw 72 is brought into engagement with the securing surface 66 of disc 46, works as follows:

The rotary movement, e.g. from an electric motor, is transmitted over input shaft 43 to the disc 44, one ring of the axial antifriction bearing 47 rotating simultaneously with said disc, whereas the other ring the axial antifriction bearing is stationary in consequence of being connected over ring 48 and spring 49 with disc 46, which is prevented from rotating by screw 72. The rolling elements 13 are rolling about the rolling ring 7 of disc 44 and the rolling ring 6 of disc 46, which is stationary, whereby the rotation of the system of rolling elements 13 with the hollow output shaft in only one direction is caused, i.e. in the direction of rotation of disc 44. By this arrangement a continuous speed variation of the hollow output shaft 2P in only one sense can be achieved. The screws 52 and 72 can be replaced e.g. by two pins (not shown), mounted movably in the housing 41, said pins being controlled e.g. by electromagnets (not shown), in order to achieve a quick change of the characteristics of the variable speed drive.

The variable speed drive according to the present invention can be used everywhere, where a continuous speed variation is required ranging from negative speed in view of the sense of rotation of the input shaft over zero revolutions to positive speed of the output shaft, or its model with the possibility of changing the characteristics everywhere, where a change of the characteristics of the variable speed drive is necessary e.g. in machine-tools.

I claim:

1. In a variable speed drive, in combination, a pair of friction disc means adapted to be rotated in opposite directions, arranged aligned along a common axis and having each a face facing a corresponding face of the other friction disc means; a plurality of rolling elements located spaced from each other and distributed about said common axis between said friction disc means and having each an outer surface in rolling engagement with said faces; a plurality of shaft means, one for each rolling element and each mounting a respective rolling element turnably about an axis of symmetry thereof; an output shaft having a portion between said friction disc means and extending along said common axis; support means fixed to said portion of said output shaft and supporting the shaft means of each of said rolling elements tiltably about a tilting axis transverse to said common axis and movably together with said output shaft about said common axis; resilient means between each of said shaft means and said portion of said output shaft for resiliently pressing the rolling element carried by the respective shaft means against said faces; and control means connected to said shaft means of said rolling element for simultaneously tilting each of said shaft means about its tilting axis, said tilting axes, said outer surfaces of said rolling elements and said faces of said friction disc means being constructed and arranged so that said rolling elements will engage said faces substantially along circles having equal diameters regardless of the angle at which said shaft means are tilted.

2. A variable speed drive as set forth in claim 1, wherein said support means includes a plurality of pins, one for each of said shaft means, extending angularly displaced from each other transverse to said common axis and each having a free end tiltably supporting the respective shaft means, and means fixed to said shaft portion and guiding each of said pins movably in direction of its elongation, said resilient means engaging said pins and being biased to resiliently urge the latter in direction away from said common axis.

3. A variable speed drive as set forth in claim 2, wherein each of said friction disc means is provided with a gear rim, and including an input shaft and gear means connected to said input shaft and meshing with said gear rims of said friction disc means for driving the same in opposite direction.

4. A variable speed drive as set forth in claim 3, wherein said input shaft extends substantially normal to said common axis.

5. A variable speed drive as set forth in claim 4, wherein said gear means is a bevel gear fixed to said input shaft for rotation therewith.

6. A variable speed drive as set forth in claim 2, and including an anti-friction bearing having a pair of races, one of which being fixed to one of said friction disc means coaxial with said common axis, and annular member coaxial with said common axis and abutting with one edge thereof against the other of said races, and compression spring means between the other edge of said annular member and the other of said friction disc means.

7. A variable speed drive as set forth in claim 6, and including a housing surrounding said friction disc means, said anti-friction bearing and said annular member, and a pair of means carried by said housing movably in engagement with a cage of said anti-friction bearing and the other of said friction disc means, respectively, for stopping rotation thereof.

References Cited by the Examiner
UNITED STATES PATENTS

| | | | |
|---|---|---|---|
| 641,325 | 1/1900 | Replogle | 74—198 |
| 1,517,722 | 12/1924 | Gerdes | 74—796 |
| 2,920,505 | 1/1960 | Hine | 74—796 X |

DAVID J. WILLIAMOWSKY, *Primary Examiner.*

L. H. GERIN, *Assistant Examiner.*